United States Patent [19]
Koves

[11] Patent Number: 5,089,115
[45] Date of Patent: Feb. 18, 1992

[54] DOWNWARDLY FORCED PARTICLE BED FOR GAS CONTACTING

[75] Inventor: William J. Koves, Hoffman Estates, Ill.

[73] Assignee: UOP, Des Plaines, Ill.

[21] Appl. No.: 555,285

[22] Filed: Jul. 20, 1990

Related U.S. Application Data

[62] Division of Ser. No. 426,907, Oct. 26, 1989, Pat. No. 4,959,198.

[51] Int. Cl.$^5$ ............................................. B01J 8/12
[52] U.S. Cl. ................................ 208/146; 208/46; 208/152; 208/165; 208/168; 208/169
[58] Field of Search ............... 208/153, 156, 46, 146, 208/152, 165, 168, 169

[56] References Cited

U.S. PATENT DOCUMENTS

| | | | |
|---|---|---|---|
| 2,046,458 | 7/1936 | Johnson | 166/8 |
| 3,652,231 | 3/1972 | Greenwood et al. | 23/288 G |
| 3,706,536 | 12/1972 | Greenwood et al. | 23/288 G |
| 3,745,112 | 7/1973 | Rausch | 208/139 |
| 3,826,738 | 7/1974 | Zenz | 208/153 |
| 3,835,029 | 9/1974 | Larson | 208/153 |
| 3,838,038 | 9/1974 | Greenwood et al. | 208/108 |
| 4,096,911 | 6/1978 | Geske | 166/234 |
| 4,259,294 | 3/1981 | van Zijll Langhout et al. | 208/152 |
| 4,276,265 | 6/1981 | Gillespie | 422/311 |
| 4,849,091 | 7/1989 | Cabrera et al. | 208/113 |
| 4,959,198 | 9/1990 | Koves | 422/218 |

Primary Examiner—Anthony McFarlane
Attorney, Agent, or Firm—Thomas K. McBride; John G. Tolomei

[57] ABSTRACT

Method for effecting contact of a gas with light particles of solid matter, where the particles are retained within particle retention screens to form a bed of particles and the particles move downward in plug flow by means of gravity. When the particles are light, that is, of relatively small size and low density, the velocity of the gas may be sufficiently high that downward movement of particles is hindered by the horizontal forces exerted on the particles by the flowing gas. This invention provides that gas flows through the bed of particles in a downwardly sloping direction instead of in a horizontal direction, so that the force exerted on a particle has a horizontal component and a downward vertical component. The vertical component of the force resulting from gas flow, along with the gravity force on a particle, is sufficient to overcome the frictional resistance to downward movement of a particle which results from the horizontal component of the flowing gas force.

5 Claims, 4 Drawing Sheets

DOWNWARDLY FORCED PARTICLE BED FOR GAS CONTACTING

CROSS REFERENCE TO RELATED APPLICATION

This invention is a divisional application of U.S. Ser. No. 426,907, filed Oct. 26, 1989 and now U.S. Pat. No. 4,959,198.

FIELD OF THE INVENTION

This invention relates to the art of fluid-solids contacting. More particularly, it relates to processes in which a fluid is contacted with particulate matter of relatively small size and low density in a moving bed of particles which is not fluidized.

BRIEF SUMMARY OF THE INVENTION

This invention is a method for effecting contact of a fluid with light particles of solid matter, where the particles are retained within particle retention screens to form a bed of particles and the particles move downward in plug flow by means of gravity. In such a system, the direction of fluid flow is normal to the movement of particles. When the particles are light, that is, of relatively small size and low density, the velocity of the fluid may be sufficiently high that downward movement of particles is hindered by the horizontal forces exerted on the particles by the flowing fluid.

This invention provides that fluid flows through the bed of particles in a downwardly sloping direction instead of in a horizontal direction, so that the force exerted on a particle has a horizontal component and a downward vertical component. The vertical component of the force resulting from fluid flow, along with the gravity force on a particle, is sufficient to overcome the frictional resistance to downward movement of a particle which results from the horizontal component of the flowing fluid force. Practice of this invention permits the use of particles of lower density and/or higher fluid mass velocity than has been possible using methods and apparatus of the prior art.

In prior art moving bed systems, some particles may be held against one of the retention screens by the horizontal force exerted on the particles by a flowing gas and remain stationary while other particles move downward. Other particles may be similarly immobilized by being forced against such immobile particles. Also, as particles move under the horizontal force resulting from the flowing gas, portions of the bed may be blown free of particles. These undesirable effects of a relatively high gas velocity are known as "pinning" and "void-blowing". Particles are "pinned" in place while other particles move downward. Particles are pushed away from a retention screen to form a space within the bed which is void of particles. Void-blowing may occur even in the absence of pinning. In addition to these two effects, high gas velocity may cause localized fluidization of the particles.

The failure of some particles to move downward as most of the particles move and the movement of particles caused by the formation of void spaces results in physical damage to the particles, which is caused by their rubbing against one another. Also, fluidization causes damage to the particles as a result of their colliding and rubbing against one another.

There are additional problems which result from the above-described effects. When a portion of the particles which make up the bed remain in place and do not move with the rest of the bed, the purpose of contacting the fluid and particles is not attained. For example, the particles may be a catalyst and the purpose of contacting the catalyst with a gas may be to recondition used catalyst so that it may be used again to promote a reaction. Catalyst particles which do not move with the bed increase the amount of catalyst needed to promote the reaction and also reduce the capacity of the reconditioning equipment.

In broad terms this invention effects contact of fluid and light particulate matter by periodically passing the particles into the top of a vertically-elongated bed of particles, where the particles are confined to form the bed by particle retention screens having fluid flow apertures through which fluid may pass; periodically withdrawing particles from the bottom of the bed, thereby causing particles to move downward within the bed by gravity; and, passing the fluid through the bed of particles such that substantially all of the particles in the bed are in contact with flowing fluid and the direction of gas flow is downwardly sloping at an angle to the horizontal which may vary from about one to about 45 degrees.

INFORMATION DISCLOSURE

U.S. Pat. No. 3,706,536 (Greenwood et al.) depicts a moving bed hydrocarbon conversion reactor system in a stacked configuration with a reducing and catalyst heating zone located at the top of the stack. The catalyst retention screens of any of the three reactor sections, such as screen members 14 and 15, may be replaced with screens fabricated in accordance with the present invention. In all of the three reactor sections, gas flows radially inward. In the practice of the present invention, the catalyst retention screens may be arranged to accommodate radially outward gas flow.

U.S. Pat. No. 3,652,231 (Greenwood et al.) shows hydrocarbon conversion catalyst regeneration apparatus in which a movable bed of catalyst is utilized and describes a continuous catalyst regeneration process. FIGS. 1 and 2 show catalyst retention screens disposed opposite and parallel to one another and FIGS. 3 and 4 depict cylindrical screens; screens of the present invention may replace either type. Gas flow through the annular-form catalyst bed is radially inward. In the practice of the present invention, radially outward gas flow may also be utilized.

U.S. Pat. Nos. 2,046,458 (Johnson), 4,096,911 (Geske), and 4,276,265 (Gillespie) show several types of screen which may be used to confine hydrocarbon conversion catalyst particles in a movable bed; these may be used in constructing catalyst retention screens in accordance with the present invention.

U.S. Pat. No. 3,838,038 lists exemplary hydrocarbon conversion processes with which moving bed regeneration apparatus incorporating the present invention may be used (column 6); the list includes hydrocracking and other hydroprocessing applications, isomerization, alkylation, and dehydrogenation.

U.S. Pat. No. 3,745,112 (Rausch) discloses a catalyst of broad utility which may be regenerated by means of a moving bed process practiced in apparatus of the present invention.

An example of a dehydrogenation catalyst which may be regenerated using the apparatus of the present invention may be seen in U.S. Pat. No. 4,438,288 (Imai et al.).

BACKGROUND OF THE INVENTION

There are many processes where it is necessary to bring into a contact a fluid and solid particulate matter. Frequently, chemical reactions as well as physical phenomenon take place as a result of such contact. An example of a process in which the present invention may be applied is the treatment of a gas stream to remove a component by means of contact with particulate solids, such as removal of sulfur dioxide from a flue gas stream upon passing the f flue gas through a bed comprising a sulfur oxide acceptor such as copper-bearing alumina spheres.

However, the present invention was developed primarily for use with particles of hydrocarbon conversion catalyst in a moving bed. Further discussion and explanation of the invention will deal with applications in hydrocarbon conversion processes, though it is not intended that the practice of this invention be limited to such use.

In many modern hydrocarbon conversion processes, a hydrocarbon in vapor form is contacted with catalyst particles which are confined within a reaction zone comprised of a vertically-elongated moving bed of catalyst particles. The particles are confined in the bed by means of catalyst retention screens, through which catalyst cannot pass. Catalyst in the bed moves downward under the influence of gravity. Hydrocarbon vapor passes through the catalyst bed in a direction which is substantially transverse to the direction of catalyst movement. Bed thickness in the direction of gas flow is uniform. U.S Pat. No. 3,706,536 (cited above) may be consulted for information on such reactor systems.

The present invention is also useful for effecting treatment needed to regenerate spent hydrocarbon conversion catalyst. After a period of time in use, the catalyst used in a hydrocarbon conversion process must be regenerated, that is, it must be treated to restore it to a satisfactory level of activity and stability for catalyzing the reaction. Regeneration consists of several different processing steps. Usually, the first step is contacting the catalyst particles, in a vertically-elongated movable bed, with a hot oxygen-containing gas stream in order to remove, by means of combustion, coke which accumulated on the catalyst particles while they were used in the hydrocarbon conversion zone. Coke is comprised primarily of carbon, which is converted to carbon dioxide in a combustion zone, or burn zone. The burn zone is located within a vessel which is commonly called a regenerator, or regeneration vessel. U.S. Pat. No. 3,652,231 (cited above) may be consulted for information on hydrocarbon conversion catalyst regeneration.

Though the present invention is useful in both reaction zones and regeneration zones which contain light catalyst, it will be explained by means of a detailed discussion of catalyst regeneration.

Catalyst particles are often comprised of one or more Group VIII noble metals (e.g. platinum, iridium, rhodium, palladium) and a halogen combined with a porous carrier, such as a refractory inorganic oxide. Alumina is a commonly used carrier. The halogen is normally chlorine. The particles are usually spheroidal and have a diameter of from about 1/16 to about $\frac{1}{8}$ inch (1.5-3.1 mm), though they may be as large as $\frac{1}{4}$ inch (6.35 mm). In a particular regenerator, however, it is desirable to use catalyst particles which fall in a relatively narrow size range.

Movement of catalyst through a regeneration zone and a reaction zone is often referred to as continuous, though in practice, it is semi-continuous. By semi-continuous movement is meant the repeated transfer of relatively small amounts of catalyst at closely spaced points in time. For example, one batch per minute may be withdrawn from the bottom of a zone and withdrawal may take one-half minute, that is, catalyst will flow for one-half minute. If the inventory in the reaction zone is large, the catalyst bed may be considered to be continuously moving.

BRIEF SUMMARY OF THE DRAWINGS

FIG. 5 is a graph showing the increase in gas mass velocity attained by practice of the invention as a function of total screen pressure drop.

DETAILED DESCRIPTION OF THE INVENTION

In order to promote an understanding of the principles of the invention, a particular exemplary process will be described. As mentioned above, the use of this example is not intended to limit the scope of the invention in any way. Also, the drawings presented herein depict only those components which are necessary to clearly describe the invention, since the use of additional required apparatus is well within the purview of one skilled in the art.

This example involves regeneration of hydrocarbon conversion catalyst. Spent catalyst is contacted with a hot oxygen-containing gas stream (known as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water.

After passing through a combustion zone located in a regeneration vessel, in which the coke is burned, catalyst is passed into a drying zone for removal of water formed in the combustion zone which has remained on the catalyst instead of being carried off with combustion gases. Water removal is accomplished by passing a hot dry air stream through the catalyst. Catalyst is passed out of the regeneration vessel after drying is accomplished. The catalyst is usually subjected to additional treatment steps in order to complete the total regeneration process; an example of an additional step is contacting the catalyst with a gas comprised of hydrogen to effect reduction of a metal component.

A dry air stream is introduced into the bottom of the regeneration vessel and flows upward, countercurrent to catalyst flow. After passing through the catalyst drying zone to accomplish removal of water, the air stream passes into the gas collection portion of the combustion zone, where it mixes with the gas produced by combustion and gases which have passed through the catalyst. This mixture, termed flue gas, is withdrawn from the combustion zone and at least a portion of it is mixed with air and recycled back to the combustion zone to contact the catalyst to effect coke burn-off. The portion which is not recycled is vented to atmosphere. In an alternate method, the air stream leaving the drying zone will have a sufficient oxygen concentration, so that it is not necessary to add more air. In the regeneration of catalyst used in the hydrocarbon conversion reaction, an additional regeneration step, known as halogenation, may be necessary, as will be discussed below.

Figure 1:
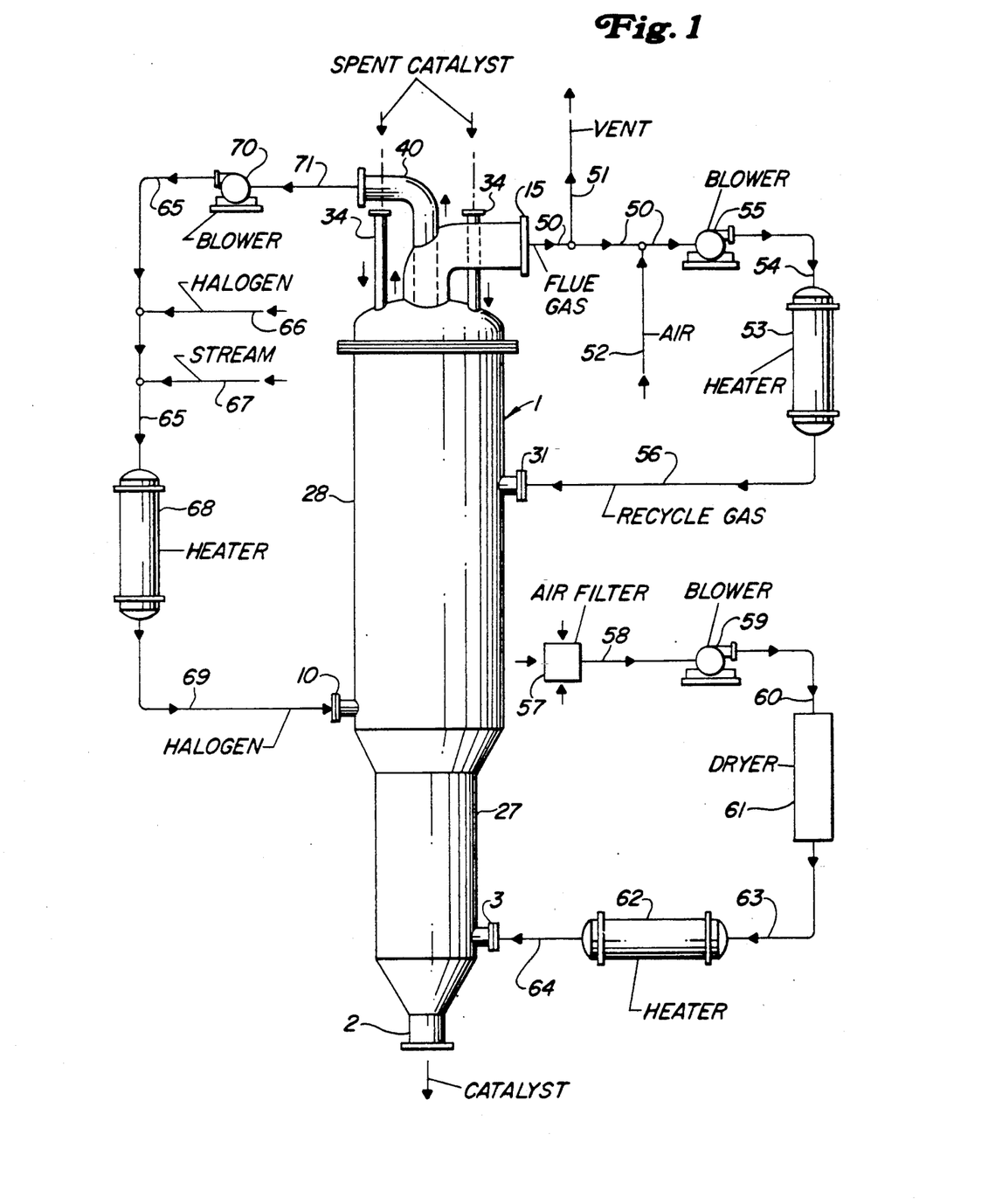
FIG. 1 depicts a catalyst regeneration vessel and associated equipment which may be used in a catalyst regeneration process.

Referring now to FIG. 1, spent catalyst particles are introduced into regeneration vessel 1 by means of nozzles 34. Though two catalyst inlet nozzles are shown, only one nozzle or multiple nozzles may be utilized. Catalyst is removed from regenerator 1 at the lower end through nozzle 2. Regenerator 1 has an upper section 28 and a lower section 27.

Flue gas leaves the upper section of the regeneration vessel through nozzle 15 and is conveyed to blower 55 by means of pipeline 50. A portion of the flue gas leaving the regenerator is vented from the system by means of pipeline 51. Air is added to the flue gas by means of pipeline 52. The gas stream may now be denoted "recycle gas". Recycle gas leaving blower 55 by means pipeline 54 and passes through heat exchanger 53 and pipeline 56 to enter the regenerator by means of nozzle 31. Heat exchanger 53 heats the recycle gas to carbon-burning temperatures.

FIG. 1 depicts a halogenation loop. As mentioned above, not all catalysts require a halogenation step as part of the regeneration process. A halogenation gas stream is provided to the halogenation section of the regenerator by means of nozzle 10. The halogenation gas exits the regenerator by means of nozzle 40 and is conveyed to blower 70 by pipeline 71 and then to heater 68 by pipeline 65. Steam is added to the halogenation gas by means of pipeline 67. Makeup halogen is added through pipeline 66. After the halogenation gas is heated, it passes through pipeline 69 to regenerator upper section 28.

Air drawn from the atmosphere by blower 59 passes through air filter 57 and is conveyed to blower 59 by pipeline 58. The air stream passes from the blower to air dryer 61 by means of pipeline 60. After water is removed from the air stream in dryer 61, the air stream flows to heater 62 by means of pipeline 63. The air stream is heated in heater 62 and passed into lower regenerator section 27 via pipeline 64 and nozzle 3.

Figures 2, 3:
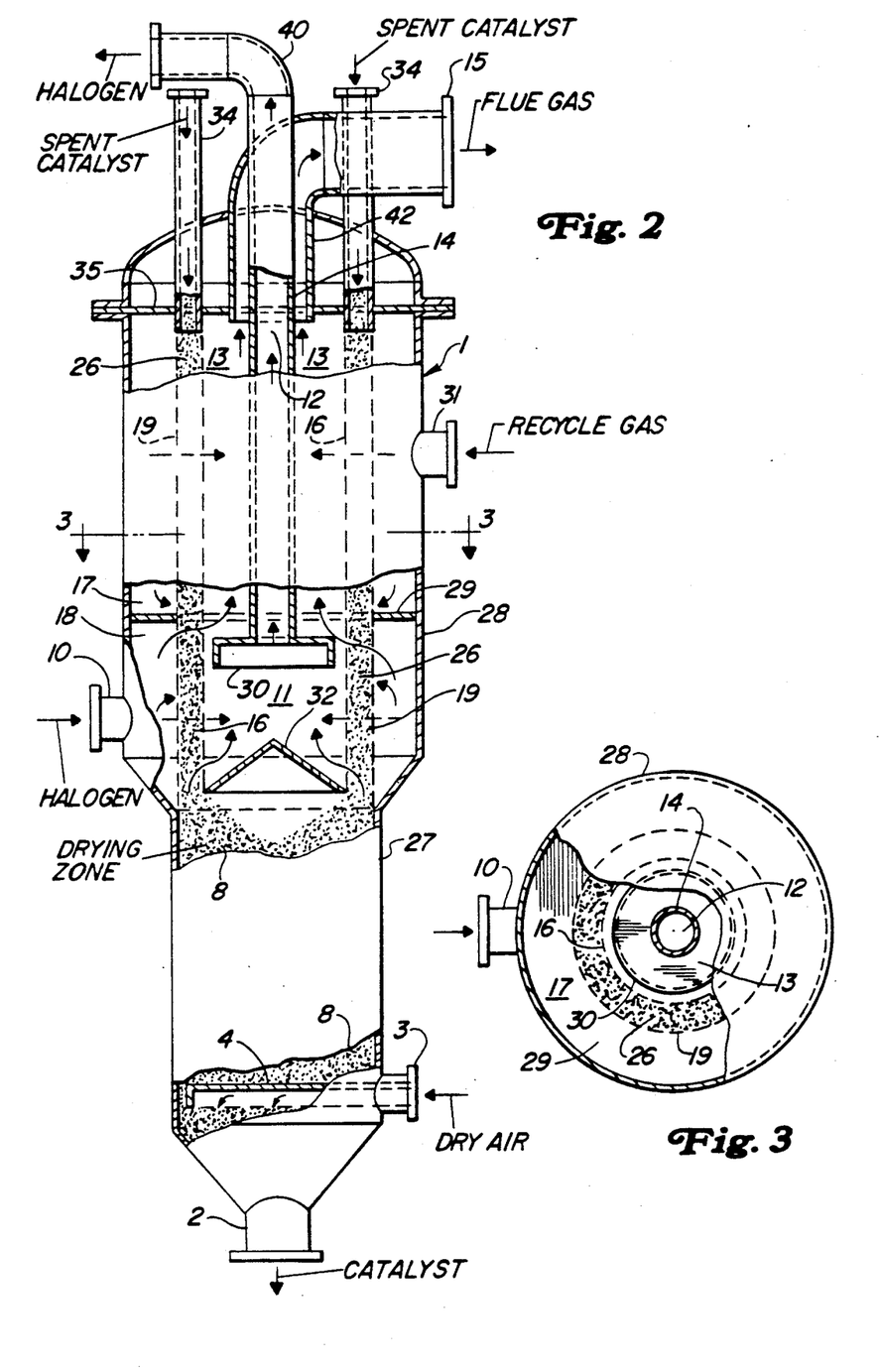
FIG. 2 is a partial sectional view schematically depicting the regenerator of FIG. 1 in greater detail.
FIG. 3 is a partial section taken along section line 3—3 in FIG. 2.

Referring now to FIG. 2, which shows the regenerator of FIG. 1 in greater detail and uses reference numbers from FIG. 1 where appropriate, there are two catalyst retention screens 16 and 19 within the upper section 28 of regeneration vessel 1. Each of the screens is cylindrical in form. The screens are represented by dashed lines; examples of particular types of screens are discussed in the following pages.

The two catalyst retention screens have as their common central axis the central axis of the regeneration vessel and are concentrically disposed in the upper section of the regeneration vessel. Screens 16 and 19 form a catalyst retention space through which a descending annular column 26, or bed 26, of catalyst moves by gravity. Catalyst inlet conduits which are downward extensions of nozzles 34 deliver catalyst at points spaced around the annular bed. The catalyst screens have openings sufficiently small to preclude catalyst particles from passing through the screens. The catalyst retention screens extend throughout the upper section of vessel 1 and deliver catalyst to the lower section 27 of regenerator 1.

The portion of the upper section of vessel 1 which is above partition 29 is termed the burn zone, or combustion zone, where combustion of coke takes place. An annular-form space which serves to distribute recycle gas around the catalyst bed is formed between catalyst retention screen 19 and the sidewall of the upper section 28 of regeneration vessel 1 and is divided into two parts by partition 29. Recycle gas enters the uppermost gas distribution space, denoted by reference number 17, by means of recycle gas nozzle 31. Partition 29 forms a barrier between recycle gas distribution space 17 and a similar space which is denoted halogenation gas distribution space 18. Partition 35 provides a top closure for recycle gas distribution space 17. Recycle gas flows radially, or horizontally, from gas distribution space 17 through the catalyst retained between screens 16 and 19 to a cylindrical central space 13, a portion of which is occupied by halogen conduit 14. A lower boundary for central space 13 is provided by end portion 30 of conduit 14. Partition 35 constitutes a top closure for central space 13 as well as gas distribution space 17. Conduits 42 and 14 and the catalyst delivery conduits 34 pass through partition 35. Central space 13 is termed flue gas collection space. Conduit 42 is an extension of nozzle 15 within the vessel and conduit 42 is in communication with gas collection space 13. Conduit 14, which is an extension of nozzle 40, passes through conduit 14 and collection space 13 but is not in communication with either.

The portion of upper regenerator section 28 which extends below partition 29 is termed the halogenation zone. A gas comprising a halogen enters the zone via halogenation nozzle 10, flows into halogenation gas distribution space 18, and then flows through the catalyst in a radial manner, entering halogenation zone central space 11. In applications where it is not necessary to utilize a halogenation zone and partition 29, halogen inlet nozzle 10, halogen outlet nozzle 40, and halogen outlet conduit 14 are omitted. Partition 29 is the top boundary of distribution space 18 and the lower boundary is formed by the necked-down portion of the regenerator at the bottom of upper section 28. End portion 30 of conduit 14 forms the upper boundary and end closure 32 forms the lower boundary of collection space 11.

Screen 19 extends into the lower section 27 of vessel 1 and catalyst discharged from the annular space between the catalyst retention screens fills all of lower section 27 of vessel 1. Catalyst moves downward through the lower section of the vessel and out of the vessel by means of catalyst outlet nozzle 2.

Nozzle 3 on regeneration vessel 1 is equipped with means for distributing air 4 to various points in a horizontal plane which is perpendicular to the descending catalyst, so that air will flow uniformly up the column in contact with all of the catalyst 8 in lower section 27, which may be denoted the drying zone.

Essentially all of the air moving up the column lower section passes into the central space enclosed by catalyst retention screen 16 which is denoted halogenation gas collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. This is accomplished by providing flow directing means, such as the enlarged end portion of conduit 14 which is denoted by reference number 30.

FIG. 3 is a top section view of vessel 1, taken as shown in FIG. 2. Halogen conduit 14 is centered on the vertical axis of the vessel. Catalyst retention screens 16 and 19 enclose the downward moving bed of catalyst 26. Gas in gas distribution space 17 flows radially through the catalyst to the central space 13 which is defined by screen 16 and also contains conduit 14. The interior of conduit 14 is denoted by reference number 12. End portion 30 of conduit 14 can also be seen in this view.

A portion of halogenation gas which passes through the bed in the halogenation zone enters central space 13, since the end portion 30 of conduit 14 is located below partition 29 (see FIG. 2). Gas passing through the catalyst in the burn zone provides the oxygen for combustion of carbon on catalyst in the burn zone and then mixes with the portion of upwardly flowing gas from the halogenation zone that did not enter conduit 14 and the mixture flows out of the vessel by means of nozzle 15.

The rate of catalyst movement through a 6-inch thick bed may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (.91 m), in order to accommodate a 36 inch flue gas pipe. Where greater catalyst movement rates are required, bed thickness may be increased. For example, for a 2000 pound per hour (907.2 kg) catalyst flow rate, a bed may be 9 inches (22.86 cm) thick and bed length will be about 13 feet (51.5 m).

There are numerous types of catalyst retention screens. Perforated plate may be used to confine catalyst particles. It may serve as a flat catalyst retention screen or may be rolled and welded to form a cylindrical retention screen. Wire cloth may be used, preferably in conjunction with perforated plate. This is available in numerous combinations of wire size, opening size, and type of weave.

For use with very small catalyst particles, a screen comprised of V-shaped wire welded to support members is preferred. U.S. Pat. Nos. 2,046,458 (cited above) and 3,652,231 (cited above) may be consulted for information on this type of screen, which is strongly preferred. In constructing a variable flow catalyst retention screen of V-shaped wire, the area for gas flow provided by the slots may be varied. Slots are the openings between the wires. Alternatively, slot area may be kept constant and the wire may be supported on, or wrapped around, a cylinder of perforated plate with gas flow openings of varying size. To minimize catalyst attrition, it is desirable that the wires be vertically oriented.

Figures 4, 6, 7, 8:
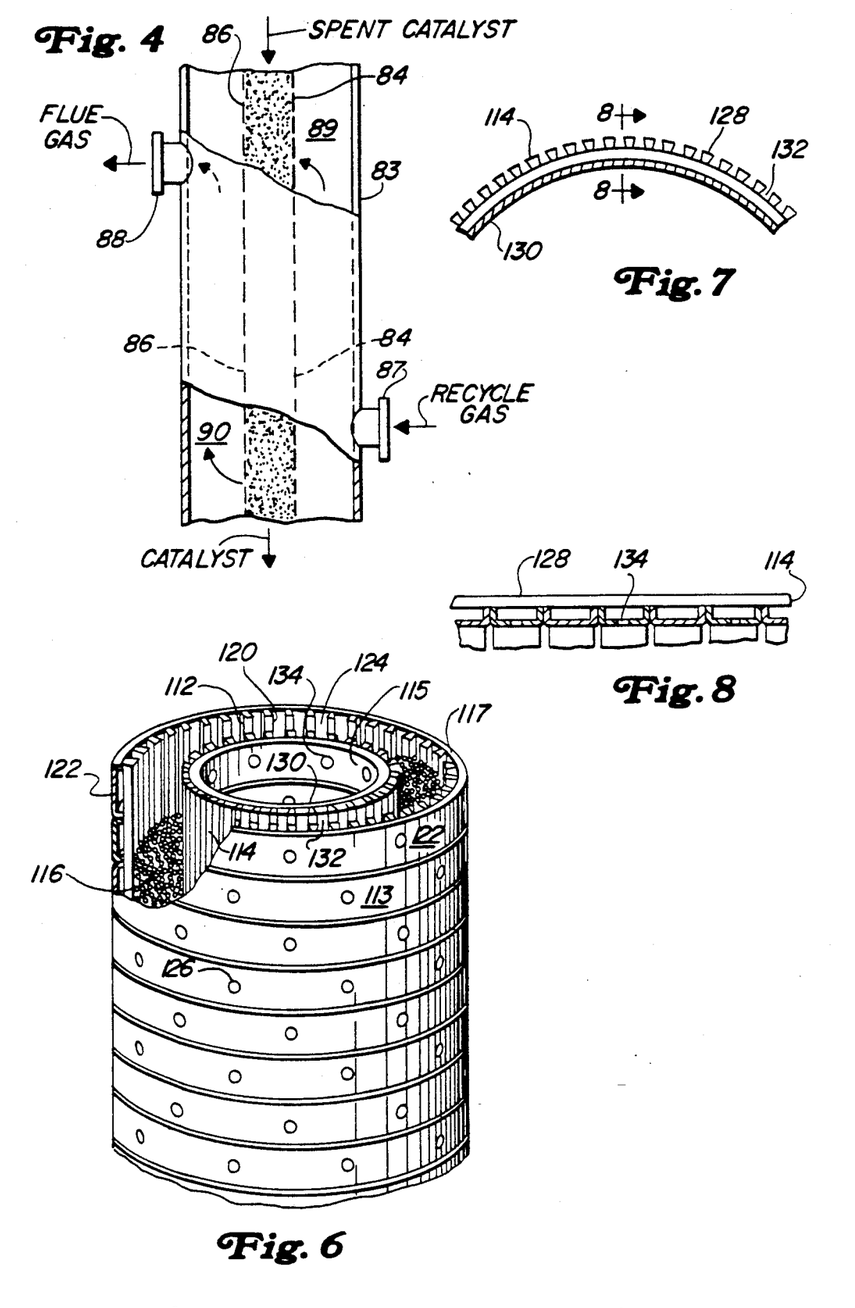
FIG. 4 is a partial section depicting a portion of a catalyst regeneration vessel having two separate flat catalyst retention screens.
FIG. 6 depicts inner and outer catalyst retention screens confining a catalyst bed.
FIG. 7 is a top view of a portion of the inner catalyst retention shown in FIG. 6.
FIG. 8 is a section view of a portion of the inner catalyst retention screen taken along line 8—8 of FIG. 7.

FIGS. 6 through 8 show a type of screen which is especially adapted for use with the present invention. U.S. Pat. Nos. 4,096,911 (cited above) and 4,276,265 (cited above) may be consulted for detailed information on this type of screen. Briefly, this screen is fabricated using V-shaped wire and the structural members commonly known as channels. This type of screen may be referred to as channel-rod screen; the channels replace the support rods shown in the U.S. patents cited in the immediately preceding paragraph. (U.S. Pat. Nos. 2,046,458 and 3,652,231). FIG. 6 depicts a top portion of a catalyst bed retained between channel-rod screen. Catalyst particles 116 are confined between inner screen 115 and outer screen 117. FIG. 7 is a top sectional view of a portion of the inner screen of FIG. 6. For reasons of drawing convenience, the top section view does not show gas flow apertures and the V-shaped wires are not crosshatched. FIG. 8 is a side sectional view of the inner screen, taken as shown in FIG. 7.

Gas flow aperture 126 is typical of those depicted in the channels of outer screen 117. Gas flow apertures 134 of the inner screen may be seen in FIGS. 6 and 8. Reference number 122 denotes the uppermost channel of the outer screen. V-shaped wire of the outer screen is denoted by reference number 112 and may be seen in FIG. 6. V-shaped wire of the inner screen is denoted by reference number 114 and may be seen in FIGS. 6, 7 and 8. The faces of the V-shaped wires which are toward the catalyst bed are denoted by reference numbers 120 and 128. Reference numbers 124 and 132 denote the slots between each V-shaped wire. The uppermost channel 130 of the inner screen may be seen in FIGS. 6 and 7. The uppermost channel of the outer screen is denoted by reference number 122 and may be seen in FIGS. 6. Channel 113 is adjacent to and below the uppermost channel of the outer screen.

Gas flows into the channels through gas flow apertures 126 and then through slots 124 to enter the catalyst bed. Note that the slots may also be defined as gas flow apertures. Gas which enters the space enclosed by a single channel and the V-shaped wires which are fastened to the channel flows within the channel in a horizontal and circumferential manner so that the flow out of the channel is substantially uniform. The gas flow space enclosed by a particular channel does not communicate with that enclosed by any other channel.

Gas exiting the bed flows through inner screen slots 132 and enters the spaces enclosed by the channels of the inner screen. It then flows circumferentially in the inner channel spaces to gas flow apertures 134. Gas flowing through the inner screen gas flow apertures enters gas collection space 13 of FIG. 2.

As discussed above, when light catalyst in a downward moving bed is contacted with gas passing horizontally through the bed, that is, when the catalyst particles are of small size and low density relative to the velocity of the gas, several undesirable effects may result. These include pinning, void-blowing, and local fluidization. These effects cause physical damage to the catalyst and make it necessary to increase equipment sizes or to accept capacity limitations to the point where it often becomes uneconomical to use light catalysts in a moving bed system.

The present invention provides that the gas flow paths through the bed slope downward, so that there is a downward component of force acting on the particles.

Where gas is flowing horizontally through a bed, the only force acting on a catalyst particle to cause it to move downward is the downward force exerted by gravity. Where gas flow paths slope downward, the force exerted by the gas on a particle may be resolved into a horizontal component and a vertical component. The vertical component is additive to the gravitational force, thus providing an increased force acting to move a particle downward.

Referring to FIG. 6, in order to cause the gas flow paths to slope downwardly, the inlet screen, which is outer screen 117, must be raised relative to the outlet screen, which is inner screen 115, since gas flow is from outside the bed to the center space enclosed by the bed. Inlet gas flow apertures in the channels must be located above the corresponding outlet gas flow apertures in the channels. No attempt has been made to show a difference in relative heights in FIG. 6; FIG. 12 is provided to illustrate the height difference.

In addition to spacing the inlet screen above the outlet screen, it is necessary to the practice of the invention to adjust the pressure drop across each screen. The sizes, locations, and numbers of apertures in the inlet screen must be such that a pressure drop across the inlet screen resulting from a gas flowing uniformly through the screen varies over the length of the screen, from a minimum at the top of the screen to a maximum at the bottom of the screen. Also, it is necessary that the reverse situation exist in regard to the outlet screen, that is, the sizes, locations, and numbers of gas flow apertures in the outlet screen must be such that a pressure drop across the outlet screen resulting from gas flowing uniformly through the screen varies over the length of the screen, from a maximum at the top of the screen to a minimum at the bottom of the screen.

Further, it is desirable that the sum of the pressure drops across the screens, for each gas flow path, be a constant, in order that gas flow through the bed be uniform. The gas flux through the bed and screens, or the flow rate of gas through the bed, can be kept substantially the same at every point by maintaining a uniform bed thickness, and by minimizing the pressure drop for gas flowing from the inlet nozzle of the vessel which contains the screens to every point on the leading edge of the inlet screen in relation to the pressure drop for gas flowing through the screens and the bed, and minimizing the pressure drop for gas flowing from every point on the downstream side of the outlet screen to the outlet nozzle of the vessel in relation to the pressure drop for gas flowing through the screens and the bed. There are circumstances where it is desirable to vary the gas flux through the bed and this may be done by adjusting the axial variation of screen pressure drop. If the frictional losses or velocity head static pressures are high, on either the upstream or downstream side of the screens and bed, uniform distribution can still be maintained by varying the total pressure drop through the screens and bed in an axial direction.

Figure 9:
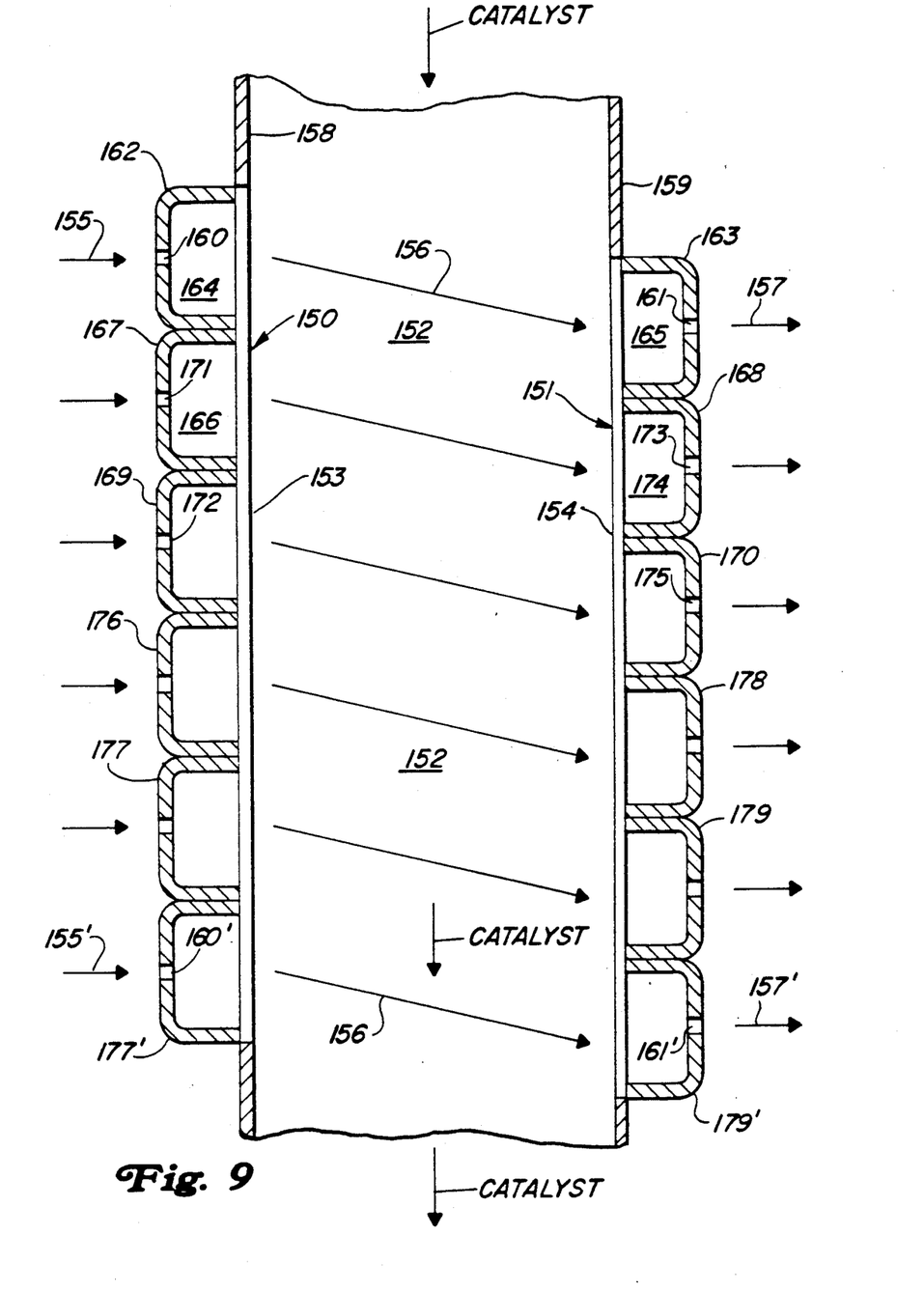
FIG. 9 is a section view of an inlet screen and an outlet screen which are arranged to practice the present invention.

FIG. 9 is used to further explain the present invention. The figure may be viewed as a vertical section taken by a plane passing through the centerline of the assembly depicted in FIG. 6. Screen assembly 150 is a portion of the top of an outer screen similar to outer screen 117 of FIG. 6. Screen assembly 151 of FIG. 12 is similar to the inner screen 115 of FIG. 6. Screen 153 is the inlet screen and screen 154 is the outlet screen. The cylindrical screen 153 is attached to and hanging from hollow cylindrical member 158, which may be viewed as a large diameter section of pipe. The cylindrical screen 154 is hanging from cylindrical member 159 in a similar manner. Catalyst (not shown) occupies the space denoted by reference number 152.

Each of the screens 153 and 154 are of the channel-rod type described above. It can be seen that the top of the inlet screen is raised above the top of the outlet screen. Gas entering the interior 164 of channel 162 by means of gas flow aperture 160, as shown by arrow 155, passes through the vertical catalyst retention wires across the open portion of channel 162 and follows a flow path generally denoted by arrow 156 to channel 163. Gas passes through the vertical wires of channel 163 to enter the space within channel 163 denoted by reference number 165 and then flows out of channel 163 by means of gas flow aperture 161, as shown by arrow 157. It can be seen that the gas flow paths through the catalyst (not shown) must be downwardly sloping, as shown by arrow 156 and the other arrows within the screens. Gas flow apertures 160 and 161 are representative of apertures spaced around the circumferences of channels 162 and 163.

A method of varying the pressure drop across the inlet screen from a minimum at the top to a maximum at the bottom is to vary the sizes of the inlet gas flow apertures while using the same number of apertures in each inlet channel. Thus, in order to vary the pressure drop, the typical aperture 160 would be larger than typical aperture 171 and aperture 171 would be larger than aperture 172, and so on to the bottom of the screen. The outlet screen pressure drop can be varied in a reverse manner, typical aperture 161 would be smaller than typical aperture 173, which would be smaller than aperture 175, and so on to the bottom of the screen. Reference number 166 denotes the space within the second inlet channel from the top and reference number 174 denotes the space within the second outlet channel from the top. The inlet channels shown, 162, 167, 169, 176, and 177 are only a portion of the channels which comprise screen 153. It can be seen that each of the depicted outlet channels, 163, 168, 170, 178, and 179 is below its corresponding inlet channel, so that all gas flow paths slope downward.

The present invention will not function if the screen pressure drops are reversed. For example, if there were a high pressure drop at the top of the inlet screen and a low pressure drop at the top of the outlet stream, gas would tend to flow upward, defeating the purpose of the invention.

Those skilled in the art are able to calculate pressure drops across screens of varying configurations. In the above example, for instance, if it is desired to use apertures all of one size, the number of apertures in each channel may be varied to obtain the desired pressure drop characteristic. For example, if apertures 160 are the same size as apertures 171, more apertures may be used in channel 162 as compared to channel 167. There are numerous combinations of aperture size, location, and quantities which may be used to obtain any one particular pressure drop characteristic.

In illustration of the invention, consider a light catalyst having a weight density of 0.0116 lb/in$^3$ in a 10 ft. long (high) bed. Bed thickness is 9 inches and each catalyst particle is assumed to be spherical and have a diameter of 0.0647 inches (approx. 1/16). Assume that the inlet screen is raised by 0.67 in. relative to the outlet screen and the pressure drop attributable to gas flowing through the bed is 1 psi. The pressure drop variation from top to bottom of the inlet screen is 1 psi. The pressure drop variation along the length of the outlet screen must also be 1 psi (in order to obtain a uniform gas flux), but in the reverse direction from the inlet screen. Compare this sytem to a conventional system where the pressure drop across either screen at any location is 0.5 psi, for a total screen drop of 1 psi.

Calculations show that practice of the invention: raising one screen and altering the gas flow aperture configuration of the screens while retaining the same total screen pressure drop, permits the allowable gas mass velocity to be increased by 39% over a conventional system. The magnitude of the improvement may also be expressed in terms of apparent density: the catalyst will behave as if it has a density of 0.01993 lb/in$^3$, about a 72% increase over the actual density.

FIG. 5 shows the effect of altering total screen pressure drop while holding the other parameters in this example constant. Note the increase in allowable mass velocity is in terms of a factor by which the mass velocity usable without the practice of the invention is multiplied, so that the above-mentioned 39% increase for a 1 psi drop is expressed as 1.39. FIG. 5 shows that the cost of increasing allowable mass velocity of gas flowing through a bed is a larger pressure drop across the catalyst retention screens. For example, to increase allowable gas mass velocity by a factor of 1.8 (80%), the catalyst retention screens must be designed to have a pressure drop of almost 3 psi.

Flat screens may be used to confine catalyst. FIG. 4 shows a portion of a regeneration vessel 83 in vertical section. Catalyst retention screens 84 and 86 each lie in a single plane. The two planes are disposed opposite to one another and parallel to one another. The view in FIG. 4 is of the edges of the screens. Recycle gas enters gas distribution space 89 through nozzle 87. Gas passes through the catalyst into gas collection space 90 and flue gas exits the regenerator through nozzle 88. A flat screen may be of any of the screen types discussed above in reference to cylindrical screen.

Commonly used total pressure drop across screens and beds typically range from 0.5 to 10 psi (3.4 to 68.9 kPa).

That which is claimed is:

1. A method for contacting a fluid with particles said method comprising:
    a) periodically passing said particles into the top of a vertically-elongated bed of particles;
    b) periodically withdrawing particles from the bottom of the bed, thereby causing particles to move downward within the bed by gravity; and,
    c) passing said fluid through said bed of particles from a vertically-extended inlet side of said bed to a vertically-extended outlet side of said bed such that the uppermost point of fluid flow from said inlet side is above the uppermost point of fluid flow to said outlet side, the lowermost point of fluid flow from said inlet side is above the lowermost point of fluid flow to said outlet side and the fluid flow through the bed is downwardly sloping at an angle to the horizontal.

2. The method of claim 1 further characterized in that:
    a) fluid flows through, in sequence, an inlet particle retention screen, the bed of particles, and an outlet particle retention screen;
    b) the total resistance to fluid flow of said inlet screen varies from a minimum resistance at the top of the inlet screen to a maximum resistance at the bottom of the inlet screen;
    c) the total resistance to fluid flow of said outlet screen varies from a maximum at the top of the screen to a minimum at the bottom of the outlet screen; and,
    d) the total resistance to fluid flow of each fluid flow path through the bed and screens is a constant.

3. The method of claim 2 wherein said particles are catalyst particles which are useful in carrying out hydrocarbon conversion reactions.

4. The method of claim 3 wherein said fluid is comprised of gaseous hydrocarbons.

5. The method of claim 3 wherein said fluid is comprised of an oxygen gas for use in regeneration of catalyst.

* * * * *